Dec. 4, 1928.
L. T. McMENEMY
1,694,102
AUTOMOBILE LUBRICATION INDICATOR
Filed Oct. 20, 1920     4 Sheets-Sheet 1
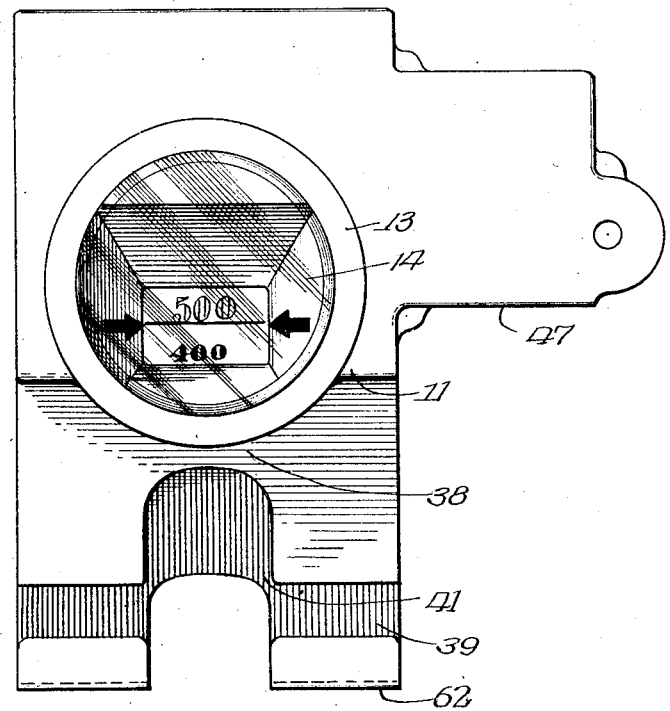
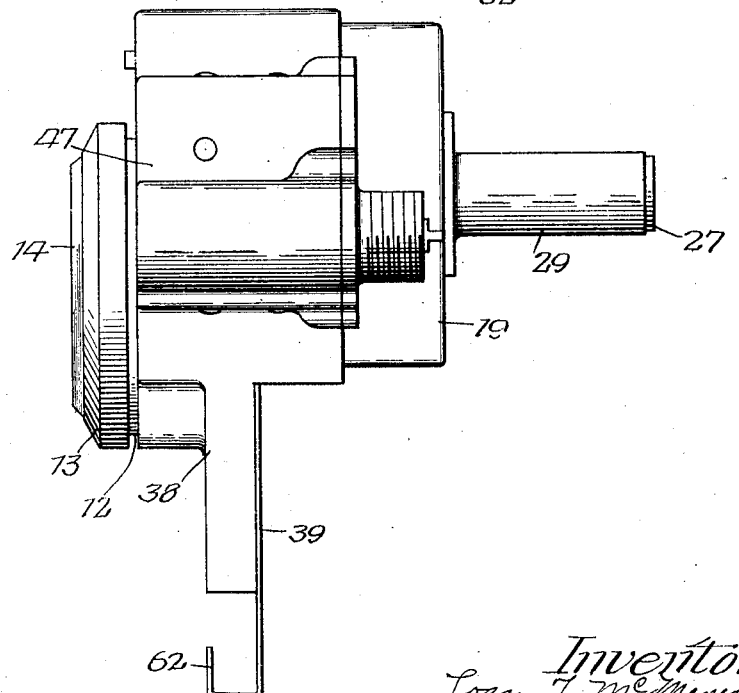
Inventor
Logan T. McMenemy
By Munday, Clarke & Carpenter
Attys Dec. 4, 1928.
L. T. McMENEMY
1,694,102
AUTOMOBILE LUBRICATION INDICATOR
Filed Oct. 20, 1920 4 Sheets-Sheet 2
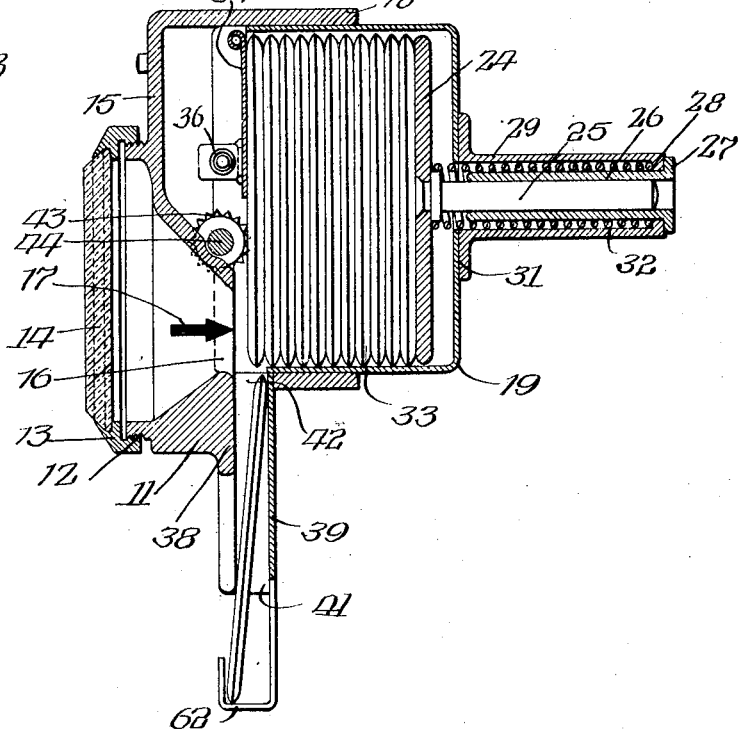
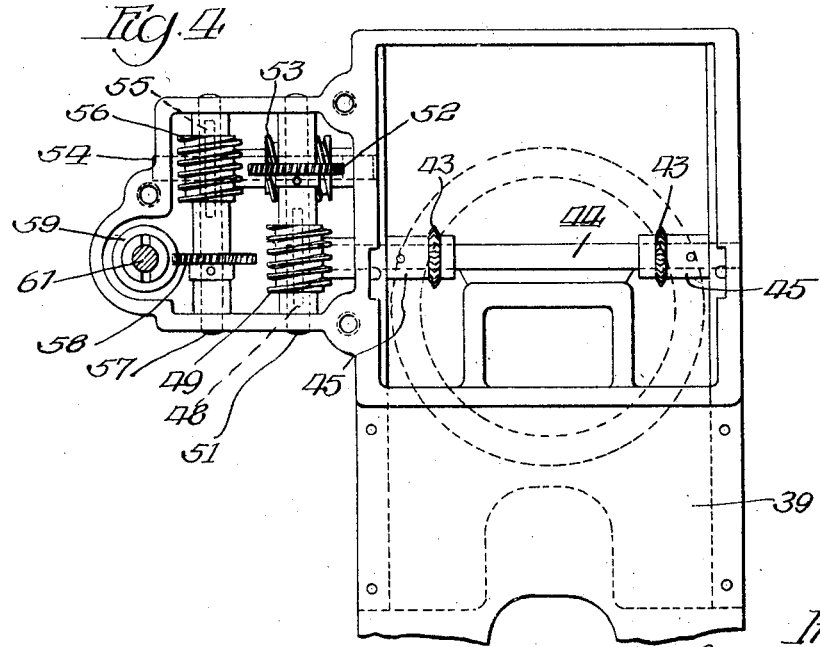
Inventor
Logan T. McMenemy
By Munday, Clarke & Carpenter
Attys Dec. 4, 1928.
L. T. McMENEMY
1,694,102
AUTOMOBILE LUBRICATION INDICATOR
Filed Oct. 20, 1920     4 Sheets-Sheet 3
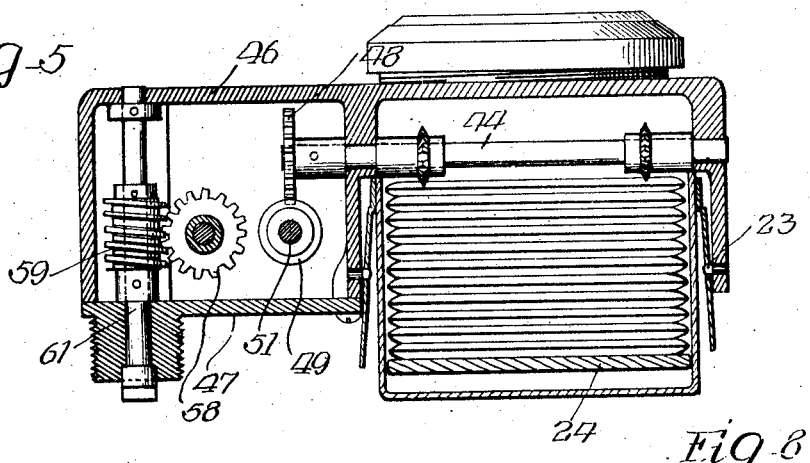
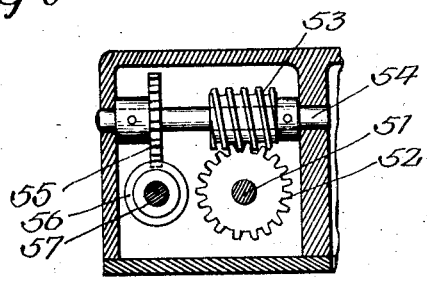
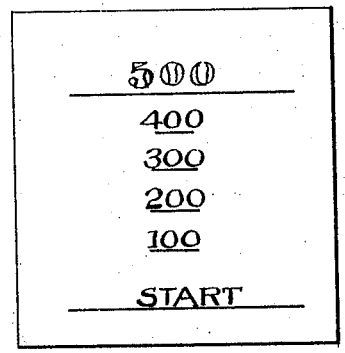
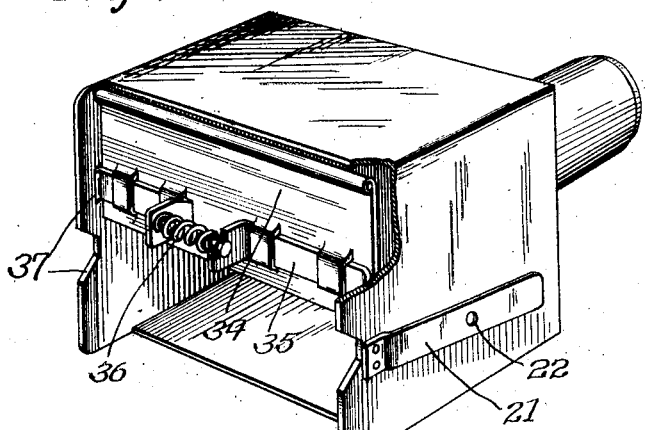
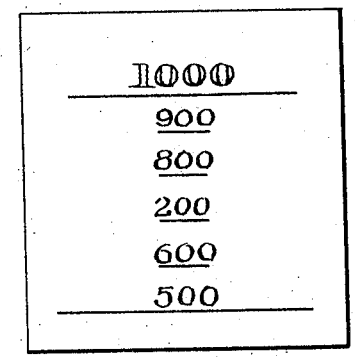
Inventor
Logan T. McMenemy
By Munday, Clarke & Carpenter
Attys Dec. 4, 1928.

L. T. McMENEMY 1,694,102

AUTOMOBILE LUBRICATION INDICATOR

Filed Oct. 20, 1920   4 Sheets-Sheet 4

Patented Dec. 4, 1928.

1,694,102

UNITED STATES PATENT OFFICE.

LOGAN T. McMENEMY, OF CHICAGO, ILLINOIS.

AUTOMOBILE LUBRICATION INDICATOR.

Application filed October 20, 1920. Serial No. 418,146.

This invention relates in general to means for indicating the desirability for oiling of the various parts of an automobile, other vehicle or piece of machinery, and the probability of need of inspection and adjustment of other parts, and also has reference to the provision of means for establishing in authentic manner a history of the care given a particular automobile, or other vehicle or piece of machinery while in the hands of a particular user. While the invention will hereinafter be described as applied to an automobile, it will be readily manifest that it has other valuable use and application,—as in aeroplanes, tractors, and indeed in various forms of stationary machinery.

It is well recognized that the value of an automobile after a period of use is largely dependent upon the care given it in use, particularly as to lubrication and the maintenance of proper adjustment of the parts.

My invention has for an important object the provision of a device or apparatus which will automatically and at the proper intervals present to the user instructions for proper lubrication, the arrangement being such that these instructions will be presented at the time lubrication of the parts requiring it should be effected, and the instructions confined to the parts to be lubricated.

A further object of the invention is the provision of a process for lubricating automobiles, which will permit the authentic recording thereof in such fashion that any one desiring to subsequently purchase the automobile may know definitely its history in the hands of the seller. Along with the matter of lubrication is or may be included adjustment of parts, replacement of parts and the matter of repairs and inspection.

Another object of the invention is the provision of a simple form of apparatus for indicating the need of lubrication, which may be driven or actuated by the speedometer shaft, and this without requiring extensive reformation thereof or interfering with the proper action of the speedometer in service.

Numerous other objects and advantages of the invention will be apparent as it is better understood from the following description, which, taken in connection with the accompanying drawings, discloses a preferred embodiment thereof.

Referring to the drawings,

Figure 1 is a front elevation of a device embodying my present invention;

Fig. 2 is a side elevation thereof;

Fig. 3 is a transverse vertical section through the same;

Fig. 4 is a rear view of the apparatus, with certain parts removed;

Fig. 5 is a horizontal sectional view;

Fig. 6 is a fragmentary similar view taken in a lower plane;

Fig. 7 is a perspective view of the casing;

Figs. 8 and 9 are front views of the first two envelopes deliverable by the apparatus of the drawing.

Figure 10:
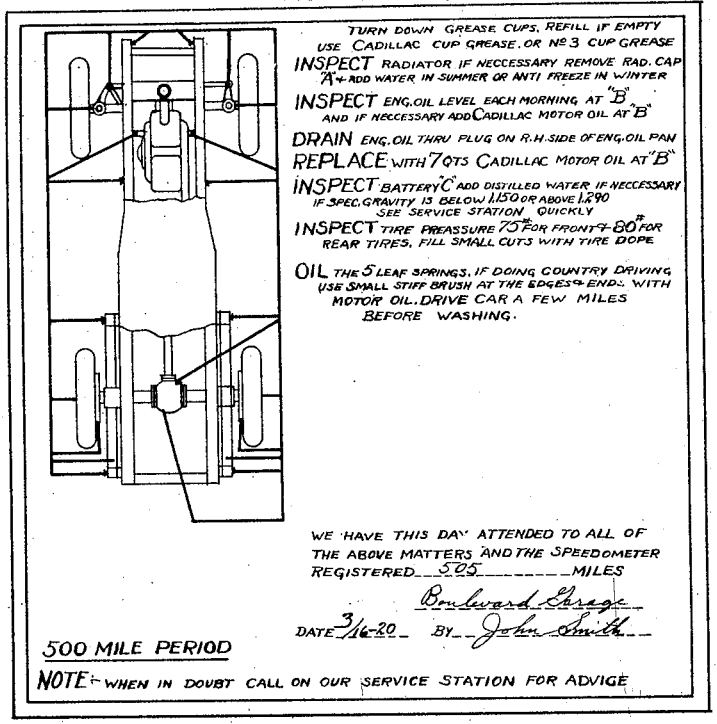
Figs. 10 and 11 are sample charts of directions.

For the purpose of illustrating my invention I have shown on the drawing an apparatus for indicating the desirability for lubrication, adjustments, and so forth. The present apparatus accomplishes this by issuing to the driver suitable directions at the end of predetermined driving periods, as for example 500 mile periods, advising him only and exactly what need be done at that stage in the life of the automobile.

This apparatus comprises a casing 11 having a circular flanged opening 12 at the front adapted to be positioned through an aperture formed for the purpose in the dash of the automobile. The flange 12 is threaded and adapted to engage a locking annulus 13 carrying a glass window 14. Back of the flange 12 the front of the casing is extended up and at the sides to provide a bearing portion 15 for engaging the inner face of the dash. Rearwardly of the flange 12 the casing narrows to an observation opening 16 preferably of rectangular form and provided with indicating arrows 17, the purpose of which will be presently disclosed. The casing has a rearwardly extending flange 18 of rectangular formation and adapted to receive a rectangular carrier 19 for envelopes containing the directions or, of course, to receive other arrangement for issuance of directions. The carrier 19 is preferably of sheet metal form and is provided at its front edge with rearwardly extending leaf springs 21 having openings 22 therein adapted to engage pins 23 in the sides of the flange 18 to hold the parts assembled. The carrier 19 contains a back plate 24 mounted upon the end of a plunger rod 25, which plunger rod has guiding bearing in a sleeve 26 arranged rearwardly of the body of the carrier and having an out-turned flange 27 secured to an inturned flange 28 upon an external sleeve 29 secured at 31 to the rear of the body of the carrier. A spring 32 is positioned between the two sleeves 26 and 29 and bears at its forward end against the follower plate 24 and at its rear end against the flange 28. This construction causes the envelopes, indicated at 33, to be pushed toward the front of the apparatus and against a front plate 34 having slides 35 pressed apart by a spring 36 into engagement with slots 37 located near the front of the carrier.

The arrangement of the parts is such that the indicating arrows 17 are located just above the lower portion of the carrier and before each envelop starts from normal position, as will be presently described, indicates indicia inscribed near the bottom of the envelop. It is intended that each envelop will be gradually moved down and finally entirely out of the carrier at the end of its 500 mile period. To this end the bottom wall of the carrier body terminates rearwardly of a downwardly projecting part 38 of the casing 11 and a backing plate 39 is mounted between rearwardly extending casing flanges 41 to provide a slot 42 for delivery of the envelopes. The envelop movement is slow and is controlled by two spur wheels 43 fixed on a cross-shaft 44 having bearings at 45 in the casing. This shaft extends over into a gear housing 46 which may, if desired, be formed as a part of the casing, having a removable side 47 to permit assembling. The shaft 44 carries at its end a worm gear wheel 48 meshing with a worm 49 on a shaft 51 in the gear housing, said shaft 51 in turn having a gear 52 meshing with a worm 53 on a shaft 54, said shaft having a gear 55 meshing with a worm 56 upon a shaft 57. This shaft is provided with a gear 58 meshing with a worm 59 upon shaft 61 which may be taken to be the speedometer shaft of the apparatus.

It will be readily understood that this gearing is designed to give an enormous reduction of movement between the speedometer shaft and the shaft 44, this reduction being such that the envelop engaged by the spurs 43 moves merely its own length for 500 miles of travel of the car and indication thereof by the speedometer. This produces delivery of an envelop at each 500 mile period and I provide at the bottom a receiving receptacle 62 to receive the envelop. The envelopes are arranged appropriately within the carrier and bear on their face distance indicia at 100 mile intervals as may be readily seen by comparing Figs. 8 and 9. Each envelop is adapted to contain a suitable chart of instructions enumerating the parts to receive attention and the character of attention to be given them. Sample charts of this character may be observed in Figs. 10 and 11. These instructions can be specific and simple and my invention obviates the necessity for the car user selecting out from general directions the things to be performed at the particular time. Furthermore, the requirements are presented at the time they are most likely to receive attention.

Figure 11:
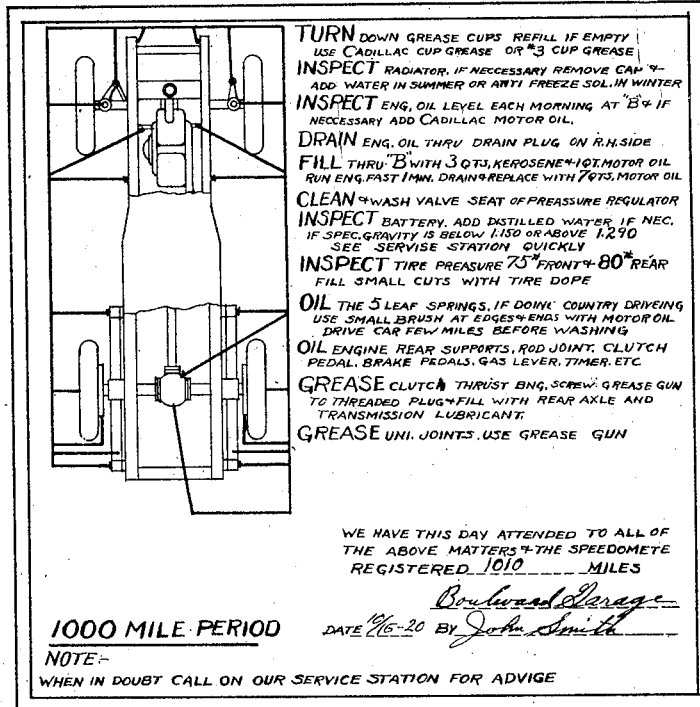

The charts shown in Figs. 10 and 11 are arranged to permit of the use of my apparatus for the provision of an authentic history of the car performance. I have provided upon them a statement to be signed by the service station or the maker or by a garage man, approved by said service station, of the fact that the acts enumerated have all been performed and the car mileage at which they were performed. These charts properly preserved and thus signed give a reliable history of the care of the car if, of course, the signers of the certificates are reliable, and it is intended in this connection that some central service station, motor club, or other organization assume the responsibility of the reliability of certain specified persons or garages in this respect. Thus operated it is easily possible for the organization assuming responsibility in a proper instance to approve the car at the time the user desires to sell it. It will be undersood, of course, that from certain aspects of my invention these charts or similar ones may be employed independently of the particular dispensing apparatus, though the best result is believed attained when used in connection therewith.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described, the combination of an automotive vehicle, a casing, a stack of separate and distinct indicia bearing charts, supported in said casing, means operated by the mechanism of the automobile for expelling the foremost chart from the stack at a predetermined instant, and means for feeding the next succeeding chart of the stack to the chart removing means.

2. A device of the class described in combination with a casing adapted to be carried by an automobile, said casing having a chamber adapted to receive a stack of indicia bearing charts, said casing having a sight aperture disposed so as to permit the observation of a suitable indicia on the foremost chart of the stack, feeding mechanism operating upon the foremost chart of the stack, means operated by the movement of the automobile for operating said feeding mechanism, for removing the foremost chart from the stack and means for moving the succeeding chart of the stack into position to be operated upon by the feeding means.

3. A device of the class described in combination with an automobile, a casing mounted thereon, said casing having a chamber adapted to contain a stack of indicia bearing charts, said casing having a sight hole for viewing desired indicia on the foremost chart of said stack, and said casing having a delivery ledge and means for successively and periodically feeding the separate charts from the stack and delivering them to the ledge.

4. A device of the class described in combination with an automobile with a casing thereon, said casing having a chamber adapted to receive a stack of indicia bearing charts and backing plate, a spring pressed plunger for pressing said stack of charts forwardly, a feeding wheel engaging the foremost chart, means for operating said feeding wheel in correspondence with the movement of the automoble whereby to move the charts separately from the stack and feed each chart to a desired position on the casing.

5. A device of the class described, the combination of an automobile and a casing mounted thereon, said casing having rearwardly extended flanges, an open faced box mounted in said flanges, said box being adapted to receive a stack of indicia bearing charts, a backing plate mounted in the rear of said box, a spring pressed plunger carried by said box for pressing forward said backing plate to shove the stack of carts forwardly in said box, a front plate mounted so as to close only a portion of the front of said box, a feed wheel carried by said casing and disposed to contact with the foremost chart of the stack within the box, said casing and box being constructed and arranged to provide a delivery slot disposed beneath the normal position of the foremost chart of the stack, and means for operating the feed wheel by means of the movement of the automobile whereby successively to deliver through the slot the foremost charts of the stack as they are moved into contact with the feed wheel.

6. A device of the class described, comprising, a casing adapted to hold a series of individual and structurally independent sheets, respectively containing instructions relative to the care of an automobile at predetermined intervals, and means carried by said casing and operably driven in correspondence with the movement of the automobile for consecutively ejecting said sheets individually at predetermined intervals, and for discharging each individual sheet into a receptacle formed on the casing, where it may attract attention and be withdrawn therefrom.

7. The combination with the speedometer mechanism of an automobile, of a casing, a series of individual and structurally independent directional sheets or charts located in said casing, a feeding mechanism operated by said speedometer mechanism for moving said sheets individually to a delivery position in respect of said casing and means for successively feeding said sheets to the feeding mechanism after the delivery of any preceding sheet.

8. The combination with an automotive vehicle, of a casing mounted thereon, a progressive series of individual and structurally independent charts in said casing, respectively provided with directional indicia for predetermined periods in the operation of the vehicle, a feeding mechanism mounted in the casing and driven from the mechanism of the automotive vehicle for ejecting the charts individually from the casing, and means for maintaining the foremost chart of the series in engagement with the feeding mechanism.

9. The combination with the operative mechanism of an automobile, of a casing carried by said automobile, means for supporting therein a series of individual and structurally independent charts, respectively bearing directional indicia relative to the care of the automobile at predetermined intervals, mechanism controlled by the movement of the automobile for periodically ejecting the foremost chart of the series and for delivering the same to a position different from the remaining charts of the series.

10. The combination with an automobile, of a casing carried thereby, a stack of individual and structurally independent directional charts supported in said casing, and a chart delivery mechanism operated in response to the movement of the vehicle for ejecting said charts individually at predetermined intervals from the stack.

11. A device of the class described, comprising, a series of individual and structurally independent sheets, respectively bearing directional indicia relating to upkeep operations at predetermined intervals in the operation of an automobile, and means driven in response to the operation of the automobile for ejecting said sheets individually at predetermined intervals from the remainder of the series and for delivering any ejected sheet to a position visually distinct from the remainder of the sheets.

LOGAN T. McMENEMY.